United States Patent … US 9,623,860 B2
Aoki et al. (45) Date of Patent: Apr. 18, 2017

(54) HYBRID VEHICLE AND CONTROL METHOD THEREFOR

(71) Applicants: Kazuma Aoki, Toyota (JP); Koji Hokoi, Toyota (JP); Hiroki Endo, Nissin (JP)

(72) Inventors: Kazuma Aoki, Toyota (JP); Koji Hokoi, Toyota (JP); Hiroki Endo, Nissin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/782,851

(22) PCT Filed: Apr. 4, 2014

(86) PCT No.: PCT/IB2014/000534
§ 371 (c)(1),
(2) Date: Oct. 7, 2015

(87) PCT Pub. No.: WO2014/167412
PCT Pub. Date: Oct. 16, 2014

(65) Prior Publication Data
US 2016/0031430 A1 Feb. 4, 2016

(30) Foreign Application Priority Data
Apr. 8, 2013 (JP) ................. 2013-080418

(51) Int. Cl.
*B60W 10/06* (2006.01)
*B60W 10/08* (2006.01)
(Continued)

(52) U.S. Cl.
CPC ............ *B60W 10/06* (2013.01); *B60W 10/08* (2013.01); *B60W 10/26* (2013.01); *B60W 20/00* (2013.01);
(Continued)

(58) Field of Classification Search
CPC ...... B60W 10/06; B60W 20/16; B60W 10/08; B60W 10/26; B60W 20/00; B60W 20/106; F01N 9/00; G05B 15/02
(Continued)

(56) References Cited

U.S. PATENT DOCUMENTS

2009/0288896 A1* 11/2009 Ichikawa ............... B60K 6/365
180/65.265
2010/0030416 A1* 2/2010 Jinno ..................... B60K 6/445
701/22
(Continued)

FOREIGN PATENT DOCUMENTS

JP 2002-285883 10/2002
JP 2008-168860 7/2008
(Continued)

*Primary Examiner* — Yazan Soofi
(74) *Attorney, Agent, or Firm* — Finnegan, Henderson, Farabow, Garrett & Dunner, LLP

(57) ABSTRACT

A hybrid vehicle includes an input device that is used by a user to request an increase in the amount of charge of the power storage device. When a request for increasing the amount of charge is made using the input device, a control device controls charging of a power storage device by a generating device so that charging of the power storage device is promoted, warms a catalyst device by operating an internal combustion engine while limiting the output of the internal combustion engine, and when the warming of the catalyst device and the request for increasing the amount of charge that is made using the input device overlap each other, the control device eases the output limitation of the internal combustion engine.

9 Claims, 7 Drawing Sheets

(51) Int. Cl.
   *B60W 10/26*   (2006.01)
   *B60W 20/00*   (2016.01)
   *B60W 50/08*   (2012.01)
   *F01N 9/00*    (2006.01)
   *G05B 15/02*   (2006.01)
   *B60W 20/16*   (2016.01)

(52) U.S. Cl.
   CPC .......... *B60W 20/106* (2013.01); *B60W 20/16* (2016.01); *B60W 50/082* (2013.01); *F01N 9/00* (2013.01); *G05B 15/02* (2013.01); *B60W 2510/244* (2013.01); *B60W 2540/04* (2013.01); *B60W 2550/00* (2013.01); *B60W 2550/402* (2013.01); *B60W 2710/0677* (2013.01); *B60W 2710/0694* (2013.01); *B60W 2710/087* (2013.01); *B60W 2710/244* (2013.01); *B60Y 2300/474* (2013.01); *F01N 2590/11* (2013.01); *F01N 2900/08* (2013.01); *Y02T 10/47* (2013.01); *Y10S 903/93* (2013.01)

(58) Field of Classification Search
   USPC .......................................................... 701/22
   See application file for complete search history.

(56) References Cited

U.S. PATENT DOCUMENTS

| | | | |
|---|---|---|---|
| 2013/0106350 A1* | 5/2013 | Ono .................... | H01M 10/44 320/109 |
| 2014/0309832 A1* | 10/2014 | Ando .................... | B60K 6/445 701/22 |
| 2015/0127479 A1* | 5/2015 | Penilla .................. | G06Q 20/18 705/26.1 |

FOREIGN PATENT DOCUMENTS

| | | |
|---|---|---|
| JP | 2011-93335 | 5/2011 |
| JP | 2011-196826 | 10/2011 |
| JP | 2012-180066 | 9/2012 |
| JP | 5177274 | 4/2013 |

* cited by examiner

HYBRID VEHICLE AND CONTROL METHOD THEREFOR

CROSS-REFERENCE TO RELATED APPLICATIONS

This application is a national phase application of International Application No. PCT/IB2014/000534, filed on Apr. 4, 2014, and claims priority of Japanese Application No. 2013-080418, filed Apr. 8, 2013, the content of both of which is incorporated herein by reference.

BACKGROUND OF THE INVENTION

1. Field of the Invention

This invention relates to a hybrid vehicle and, in particular, to a hybrid vehicle including a generating device capable of charging a power storage device in use of output of an internal combustion engine and to a control method for the hybrid vehicle.

2. Description of Related Art

Japanese Patent Application Publication No. 2011-93335 (JP 2011-93335A) discloses a hybrid vehicle equipped with a generator capable of generating charging power for a power storage device using output of an internal combustion engine. With this hybrid vehicle, when a charge request issued by a user for increasing an amount of charge of the power storage device is detected, the output of the internal combustion engine is increased as compared to when a charge request is not detected so as to promote charging of the power storage device.

According to this hybrid vehicle, in addition to conventional charge/discharge control for maintaining the amount of charge of the power storage device at a target level, charge/discharge management of the power storage device in accordance with the user's intentions can be realized so as to increase the amount of charge in preparation for selection of EV travel (travel by shutting down the internal combustion engine and using only a motor) or selection of a power mode (refer to JP 2011-93335 A).

SUMMARY OF THE INVENTION

While the hybrid vehicle described in JP 2011-93335 A is useful in that an amount of charge of a power storage device can be increased by increasing output of an engine in response to a charge request from the user, priorities when an execution timing of increasing engine output overlaps with other control that involve limiting output of the engine are not particularly taken into consideration.

This invention provides a hybrid vehicle that takes into consideration other control that involve limiting output of an engine when increasing an amount of charge of a power storage device in response to a request by a user and a control method for the hybrid vehicle.

A hybrid vehicle according to a first aspect of the invention includes: a power storage device; an internal combustion engine; a generating device that generates charging power of the power storage device in use of output of the internal combustion engine; a control device that controls charging of the power storage device by the generating device; an input device that is used by a user to request an increase in the amount of charge of the power storage device; and a catalyst device that cleans exhaust gas, which is discharged from the internal combustion engine, with a catalyst. When a request for increasing the amount of charge is made using the input device, the control device controls charging of the power storage device by the generating device so that charging of the power storage device is promoted, warms the catalyst device by operating the internal combustion engine while limiting the output of the internal combustion engine, and when the warming of the catalyst device and the request for increasing the amount of charge that is made using the input device overlap each other, the control device eases the output limitation of the internal combustion engine.

In the aspect described above, the control device may include a charge promotion control unit that controls charging of the power storage device by the generating device so that charging of the power storage device is promoted when the request for increasing the amount of charge is made using the input device and a warming control unit that warms the catalyst device by operating the internal combustion engine while limiting the output of the internal combustion engine, and when the warming of the catalyst device and the request for increasing the amount of charge that is made using the input device overlap each other, the warming control unit may ease the output limitation of the internal combustion engine.

In addition, in the configuration described above, the control device may ease the output limitation of the internal combustion engine only when a prescribed condition is met when the warming of the catalyst device and the request for increasing the amount of charge that is made using the input device overlap each other.

Furthermore, in the configuration described above, the hybrid vehicle may further include a communication device capable of communicating with outside of the vehicle, and the prescribed condition may be a reception of prescribed information by the communication device.

In addition, in the configuration described above, the prescribed information may include information related to a disaster. Furthermore, in the configuration described above, the hybrid vehicle may further include a power feeding device, wherein the power feeding device is provided in order to feed at least one of power stored in the power storage device and power generated by the generating device to the outside of the vehicle, and the prescribed conditions may be a request of the feeding of power by the power feeding device to the outside of the vehicle.

In addition, in the aspect described above, when the request for increasing the amount of charge is made using the input device, the control device may control charging of the power storage device by the generating device so as to enhance a charged state of the power storage device.

Furthermore, in the aspect described above, when the request for increasing the amount of charge is made using the input device, the control device may control charging of the power storage device by the generating device so as to increase a charging rate of the power storage device.

In the aspect described above, an input device that is used by a user to request an increase in the amount of charge of a power storage device is provided. When the request for increasing the amount of charge is made using the input device, charging of the power storage device by a generating device is performed so that charging of the power storage device is promoted (charge promotion control). On the other hand, warming of a catalyst device is performed by operating an internal combustion engine while limiting output of the internal combustion engine (catalyst warming control). When catalyst warming control and charge promotion control overlap each other, since the output limitation of the internal combustion engine is eased, charge promotion control is not limited due to catalyst warming. Therefore, according to the aspect described above, the amount of charge of the power storage device can be swiftly increased in response to the request from the user.

In addition, a control method for a hybrid vehicle according to a second aspect of the invention is a control method for a hybrid vehicle including: a power storage device; an internal combustion engine; a generating device that generates charging power of the power storage device in use of output of the internal combustion engine; a control device that controls charging of the power storage device by the generating device; an input device that is used by a user to request an increase in the amount of charge of the power storage device; and a catalyst device that cleans exhaust gas, which is discharged from the internal combustion engine, with a catalyst, this control method including: controlling, when a request for increasing the amount of charge is made using the input device, charging of the power storage device by the generating device so that charging of the power storage device is promoted; warming the catalyst device by operating the internal combustion engine while limiting the output of the internal combustion engine, and easing the output limitation of the internal combustion engine when the warming of the catalyst device and the request for increasing the amount of charge that is made using the input device overlap each other.

The second aspect described above achieves similar effects to the first aspect described earlier.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
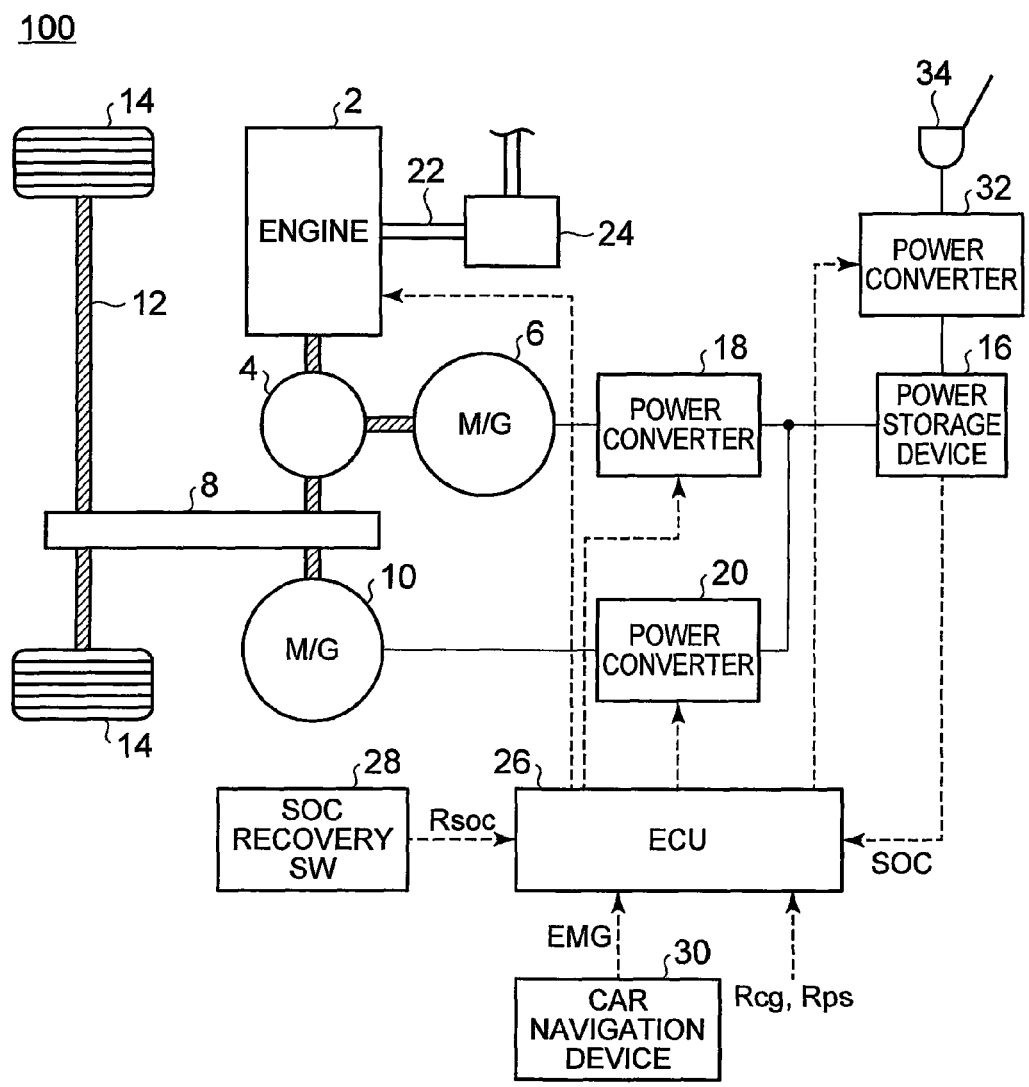
FIG. 1 is an overall block diagram of a hybrid vehicle according to an embodiment of the invention.

Hereinafter, embodiments of the invention will be described in detail with reference to the drawings. While a plurality of embodiments will be described below, appropriately combining configurations described in the respective embodiments is contemplated in the original application. Moreover, similar or corresponding portions in the drawings will be denoted by similar reference numerals and descriptions thereof will not be repeated.

FIG. 1 is an overall block diagram of a hybrid vehicle according to a first embodiment of the invention. Referring to FIG. 1, a hybrid vehicle 100 includes an engine 2, an exhaust pipe 22, a catalyst device 24, a power splitting device 4, motor generators 6 (MGs) and 10, a transmission gear 8, a drive shaft 12, and wheels 14. The hybrid vehicle 100 further includes a power storage device 16, power converters 18, 20, and 32, a connecting part 34, an ECU 26, an SOC recovery switch 28, and a car navigation device 30.

The power splitting device 4 is coupled to the engine 2, the MG 6, and the transmission gear 8 and distributes power therebetween. For example, a planetary gear having three rotary shafts of a sun gear, a planetary carrier, and a ring gear is used as the power splitting device 4. The three rotary shafts are respectively connected to rotary shafts of the MG 6, the engine 2, and the transmission gear 8. A rotary shaft of the MG 10 is coupled to the rotary shaft of the transmission gear 8. In other words, the MG 10 and the transmission gear 8 have a same rotary shaft and the rotary shaft is connected to the ring gear of the power splitting device 4.

Kinetic energy that is generated by the engine 2 is distributed between the MG 6 and the transmission gear 8 by the power splitting device 4. The engine 2 is built into the hybrid vehicle 100 as a power source which drives the transmission gear 8 that transmits power to the drive shaft 12 and which drives the MG 6. The MG 6 is built into the hybrid vehicle 100 and operates as a generator which is driven by the engine 2 and which is capable of starting the engine 2. In addition, the MG 10 is built into the hybrid vehicle 100 as a power source which drives the transmission gear 8 that transmits powerto the drive shaft 12.

The power storage device 16 is a rechargeable direct current (DC) power source and is constituted by a secondary battery made of nickel hydride, lithium ions, or the like. The power storage device 16 supplies power to the power converters 18 and 20. In addition, the power storage device 16 is charged by receiving generated power when the MG 6 and/or 10 is generating power.

Furthermore, the power storage device 16 is also charged by receiving power supplied from a power source outside of the vehicle (not shown) which is electrically connected to the connecting part 34 when charging is performed by the power source outside of the vehicle (hereinafter, also referred to as "external charging"). Moreover, when feeding power to an electric load (not shown) that is electrically connected to the connecting part 34 (hereinafter, also referred to as "external feeding"), the power storage device 16 supplies stored power to the power converter 32.

A large-capacity capacitor can also be adopted as the power storage device 16. Any power buffer may be used as the power storage device 16 as long as the power buffer is capable of temporarily storing generated power of the MGs 6 and 10 and power from a power source that is electrically connected to the connecting part 34 and supplying stored power to the MGs 6 and 10 and to an electric load that is electrically connected to the connecting part 34. Moreover, voltage of the power storage device 16 is, for example, 200V.

In addition, the power storage device 16 calculates a charged state (hereinafter, referred to as an SOC) of the power storage device 16 based on storage voltage and input/output currents and outputs the calculated SOC to the ECU 26. SOC expresses an amount of charge with respect to a fully charged state of the power storage device 16 as 0 to 100% and represents a remaining capacity of the power storage device 16. Voltage and input/output current of the power storage device 16 are respectively detected by a voltage sensor and a current sensor (both not shown). Moreover, detected values of the voltage and input/output currents of the power storage device 16 may be outputted to the ECU 26 from the power storage device 16 to have the ECU 26 calculate SOC.

Based on a control signal received from the ECU 26, the power converter 18 converts power generated by the MG 6 into DC power and outputs the DC power to the power storage device 16. Based on a control signal received from the ECU 26, the power converter 20 converts DC power supplied from the power storage device 16 into alternating current (AC) power and outputs the AC power to the MG 10.

When the engine 2 is started, the power converter 18 converts DC power supplied from the power storage device 16 into AC power and outputs the AC power to the MG 6. In addition, during braking of the vehicle or during acceleration reduction on a downward slope, the power converter 20 converts power generated by the MG 10 into DC power and outputs the DC power to the power storage device 16. The power converters 18 and 20 are constituted by inverters. Alternatively, a converter that boosts input voltage of the power converters 18 and 20 up to or over voltage of the power storage device 16 may be provided between the power storage device 16 and the power converters 18 and 20.

The MGs 6 and 10 are AC motors and are constituted by, for example, three-phase AC synchronous motors in which a permanent magnet is embedded in a rotor. The MG 6 converts kinetic energy generated by the engine 2 into electrical energy and outputs the electrical energy to the power converter 18. In addition, the MG 6 generates a drive force using three-phase AC power received from the power converter 18 and starts the engine 2.

The MG 10 generates drive torque of the vehicle using three-phase AC power received from the power converter 20. In addition, during braking of the vehicle or during acceleration reduction on a downward slope, the MG 10 converts dynamic energy stored in the vehicle as kinetic energy or potential energy into electrical energy and outputs the electrical energy to the power converter 20.

The engine 2 converts heat energy created by combustion of fuel into kinetic energy of a motor such as a piston or a rotor and outputs the converted kinetic energy to the power splitting device 4. For example, when the motor is a piston and a motion of the piston is a reciprocating motion, the reciprocating motion is converted into a rotary motion via a so-called crank mechanism and the kinetic energy of the piston is transmitted to the power splitting device 4.

The catalyst device 24 is provided in the exhaust pipe 22 of the engine 2 and cleans exhaust gas that is discharged from the engine 2 using a catalyst. The catalyst device 24 is warmed in order to activate the catalyst. The warming of the catalyst device 24 is performed using the exhaust gas of the engine 2 by operating the engine 2 while limiting output from the engine 2.

Based on a control signal received from the ECU 26, the power converter 32 converts power from a power source (not shown) outside of the vehicle which is electrically connected to the connecting part 34 into a voltage level of the power storage device 16 and outputs the power to the power storage device 16. In addition, the power converter 32 converts at least one of power stored in the power storage device 16 and power generated by the MG 6 using output of the engine 2 into a voltage level of an electric load (not shown) that is electrically connected to the connecting part 34 and outputs the power to the connecting part 34. Moreover, the power converter 32 may be constituted by a converter which performs voltage conversion of power inputted from the connecting part 34 and outputs the voltage-converted power to the power storage device 16 and an inverter which performs voltage conversion of power supplied from the power storage device 16 and outputs the voltage-converted power to the connecting part 34 or may be constituted by a single bidirectional converter.

The car navigation device 30 is configured to be capable of communicating with the outside of the vehicle and is capable of detecting a vehicle position using a global positioning system (GPS) or the like which measures a vehicle position using an artificial satellite. In addition, the car navigation device 30 is capable of receiving disaster-related information which is transmitted in the event of a disaster from an information providing facility or the like outside of the vehicle as well as information related to a crisis or an emergency (hereinafter, collectively referred to as "disaster information") and transmits received disaster information EMG to the ECU 26.

The ECU 26 includes a central processing unit (CPU), a storage device, an input/output buffer, and the like (none shown). The ECU 26 is responsible for input of various signals from the SOC recovery switch 28, the power storage device 16, and the like and output of control signals to the respective devices, and controls the respective devices in the hybrid vehicle 100. Moreover, the control of the respective devices is not limited to processing by software and can also be processed by dedicated hardware (electronic circuit).

When travel load is small and efficiency of the engine 2 declines such as when the vehicle is stopped or traveling at low speed, the ECU 26 controls the power converter 20 so as to stop the engine 2 and travel using only the MG 10 (EV travel). When the travel load increases and the engine 2 can run efficiently, the ECU 26 controls the engine 2 and the power converters 18 and 20 so as to start the engine 2 and the vehicle travels using both the engine 2 and the MG 10 (HV travel).

In addition, when the SOC received from the power storage device 16 drops below a prescribed target, the ECU 26 controls the engine 2 and the power converter 18 so that the MG 6 generates power using output of the engine 2, to charge the power storage device 16. Furthermore, during braking of the vehicle or during acceleration reduction on a downward slope, the ECU 26 controls the power converter 20 so that regenerative power generation by the MG 10 is performed.

In addition, upon receiving a request signal Rcg for requesting external charging, the ECU 26 controls the power converter 32 so as to convert power inputted from the connecting part 34 into charging voltage of the power storage device 16 and to output the charging voltage to the power storage device 16. Furthermore, upon receiving a request signal Rps for requesting external power feeding, the ECU 26 controls the power converter 32 so as to convert at least one of power stored in the power storage device 16 and power generated by the MG 6 using output of the engine 2 into commercial voltage or the like and to output the commercial voltage to the connecting part 34.

Moreover, the requests for external charging and external power feeding may be made by, for example, determining a type of a connector (for external charging/for external power feeding) that is connected to the connecting part 34 or providing input means for issuing a request for external charging/external power feeding.

In addition, upon receiving a request signal Rsoc from the SOC recovery switch 28 (to be described later), the ECU 26 executes charge control. (charge promotion control) using the engine 2 and the MG 6 so that charging of the power storage device 16 is promoted. The charge promotion control involves raising an SOC control target to higher than normal (when charge promotion control is not being executed) or increasing a charging rate (an amount of charge per unit time) of the power storage device 16 so as to exceed a normal charging rate and differs from normal charging control which maintains the SOC at a fixed control target during HV travel.

The SOC recovery switch 28 is an input device used by a user to request an increase in an amount of charge of the power storage device 16. In preparation of EV travel that is performed by operating a separately provided EV travel request switch (not shown) or power travel (a travel mode which increases vehicle acceleration performance with respect to an accelerator pedal operation) that is performed by operating a separately provided power mode switch (not shown), the user can request the vehicle to increase the amount of charge of the power storage device 16 by operating the SOC recovery switch 28. When the SOC recovery switch 28 is operated by the user, a request signal Rsoc is outputted from the SOC recovery switch 28 to the ECU 26. Alternatively, a configuration may be adopted in which the user can request an increase in the amount of charge by using audio input means or the like in place of the SOC recovery switch 28.

Moreover, the user can implement selection between two charging modes by operating the SOC recovery switch 28. One is a "fast charge mode" for causing the SOC to increase rapidly. When the fast charge mode is selected using the SOC recovery switch 28, the ECU 26 controls the engine 2 and the power converter 18 so as to immediately start the engine 2 and operate the MG 6 in order to forcibly charge the power storage device 16.

The other is a "slow charge mode" for suppressing charging of the power storage device 16 when the travel load is small in comparison to when the travel load is large. When the slow charge mode is selected using the SOC recovery switch 28, the ECU 26 controls the engine 2 and the power converter 18 so as to increase the SOC when the engine 2 is being operated in accordance with the travel load. The slow charge mode is also intended to increase the SOC, and when the slow charge mode is selected, the SOC control target is raised or the charging rate of the power storage device 16 is increased compared to normal SOC control during which an SOC increase request is not made.

Figure 2:
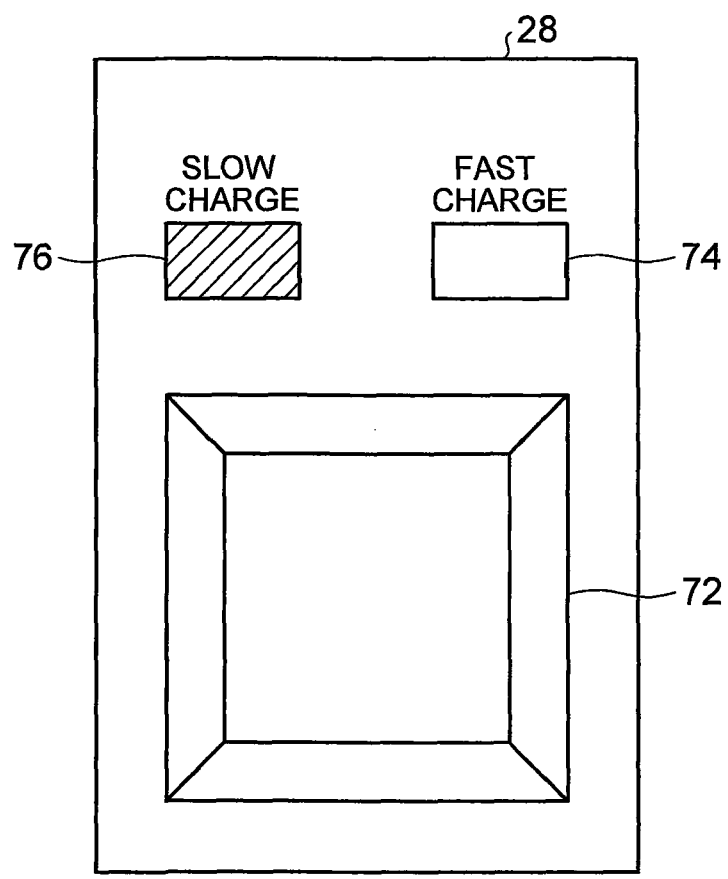
FIG. 2 is a diagram showing an example of an external shape of a state of charge (SOC) recovery switch.
Figure 3:
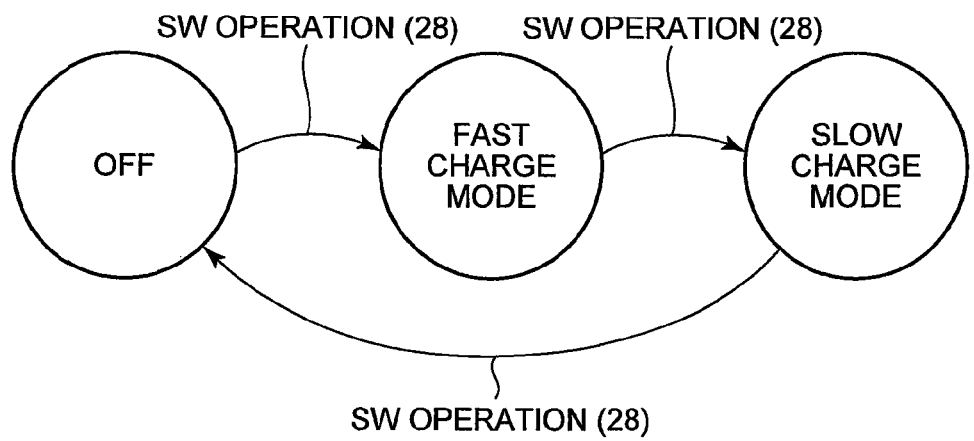
FIG. 3 is a diagram showing mode transitions when the SOC recovery switch is operated.

FIG. 2 is a diagram showing an example of an external shape of the SOC recovery switch 28. In addition, FIG. 3 is a diagram showing a mode transition when the SOC recovery switch 28 is operated. Referring now to FIGS. 2 and 3, the SOC recovery switch 28 includes an operating unit 72 and display units 74 and 76. Each time the user operates the operating unit 72, the fast charge mode, the slow charge mode, and an off state (a state where an increase in the amount of charge is not requested) are successively switched. The sequence of the fast charge mode and the slow charge mode may be interchanged.

Which of the fast charge mode, the slow charge mode, and the off state has been selected is notified from the ECU 26 to the SOC recovery switch 28. In addition, the display unit 74 lights up when the fast charge mode is selected and the display unit 76 lights up when the slow charge mode is selected.

Once again referring to FIG. 1, when the fast charge mode is selected, the ECU 26 executes charge promotion control in which the engine 2 is operated regardless of the travel load of the vehicle and which the power storage device 16 is charged using the engine 2 and the MG 6 to promote charging of the power storage device 16. Accordingly, the amount of charge of the power storage device 16 can be swiftly restored.

In addition, when the slow charge mode is selected, the ECU 26 executes charge promotion control in which the power storage device 16 is charged using the engine 2 and the MG 6 during operation of the engine 2 in accordance with the travel load to promote charging of the power storage device 16. In other words, when the travel load is small although the slow charge mode is selected, the ECU 26 controls the power converter 20 so as to stop the engine 2 and perform EV travel using only the MG 10. As the travel load increases and the engine 2 is started, the ECU 26 executes the charge promotion control described earlier using the engine 2 and the MG 6.

The ECU 26 further executes warming control for warming the catalyst device 24. Specifically, in order to warm the catalyst device 24, the ECU 26 operates the engine 2 while limiting output of the engine 2.

At this point, when warming control for warming the catalyst device 24 and charge promotion control by the SOC recovery switch 28 overlap each other, the ECU 26 eases the output limitation on the engine 2. As described above, since the output of the engine 2 is limited during warming control, a large portion of the output of the engine 2 is used for travel and charging of the power storage device 16 using the output of the engine 2 is limited. Therefore, in the first embodiment, when an increase of the amount of charge of the power storage device 16 is requested by the user using the SOC recovery switch 28, the intentions of the user are respected by prioritizing charge promotion control by easing the output limitation on the engine 2.

Moreover, in the first embodiment, when warming control and charge promotion control overlap each other, the output limitation on the engine 2 is eased only when disaster information is being received by the car navigation device 30. This is performed so as to give higher priority to increasing the amount of charge of the power storage device 16 than warming the catalyst device 24 only when the user operates the SOC recovery switch 28 based on disaster information in order to use the hybrid vehicle 100 as a power generating facility capable of external power feeding when a disaster Or the like occurs.

Moreover, while the description given above assumes that various controls are to be executed by a single integrated ECU 26, alternatively, the ECU 26 may be provided with separate configurations such as an ECU for controlling the engine, an ECU for controlling the MGs 6 and 10 (the power converters 18 and 20), an ECU for monitoring the power storage device 16, and an ECU for controlling the power converter 32 for external charging and external power feeding.

Figure 4:
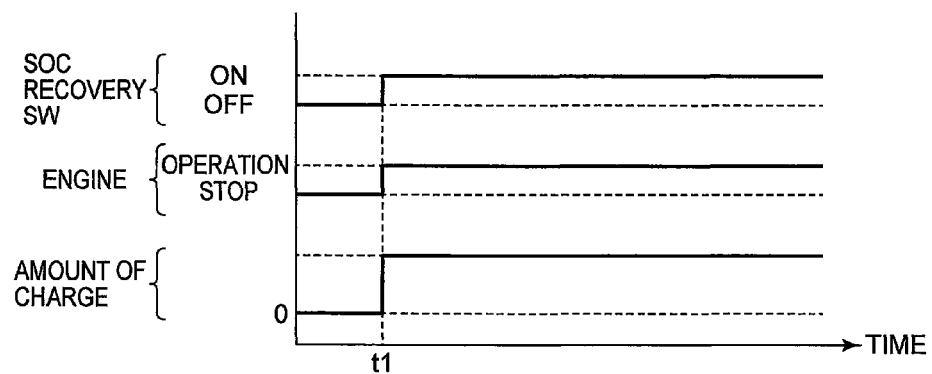
FIG. 4 is a timing chart showing a charging operation in a fast charge mode.

FIG. 4 is a timing chart showing a charging operation in the fast charge mode. Referring to FIG. 4, at time t1, when the SOC recovery switch 28 is turned on to select the fast charge mode, the engine 2 is started. The MG 6 generates power using output of the engine 2 and the power storage device 16 is charged to a prescribed amount of charge so as to promote charging of the power storage device 16.

Figure 5:
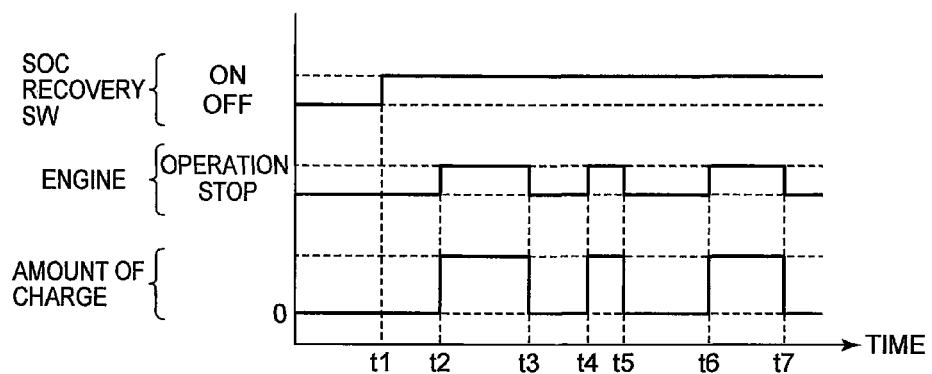
FIG. 5 is a timing chart showing a charging operation in a slow charge mode.

FIG. 5 is a timing chart showing a charging operation in the slow charge mode. Referring to FIG. 5, let us assume that at time t1, the SOC recovery switch 28 has been turned on to select the slow charge mode. The travel load at this point is small and the engine 2 is stopped. In addition, the engine 2 is not immediately started at this timing.

At time t2, when the engine 2 is started due to an increase in the travel load, the MG 6 generates power using output of the engine 2 and the power storage device 16 is charged to a prescribed amount of charge so as to promote charging of the power storage device 16.

Moreover, even when the SOC recovery switch 28 is turned off (when the fast charge mode/slow charge mode is not selected), charging of the power storage device 16 using the engine 2 and the MG 6 is performed to maintain the SOC. When the slow charge mode is selected, the SOC target value is raised than normal or a charging rate of the power storage device 16 is increased than normal.

At time t3, when the engine 2 stops due to a decline in the travel load, charging of the power storage device 16 is also stopped. In this manner, in the slow charge mode, instead of continuously operating the engine 2 and forcibly charging the power storage device 16 as is the case of the fast charge mode, charging of the power storage device 16 is stopped when the engine 2 stops in accordance with a decline in the travel load. Accordingly, although recovery of the SOC is slower than in the fast charge mode, a decline in efficiency when charging at an operating point where efficiency of the engine 2 is low can be avoided and deterioration of NV due to the engine 2 being operated under a low travel load can also be avoided.

Figure 6:
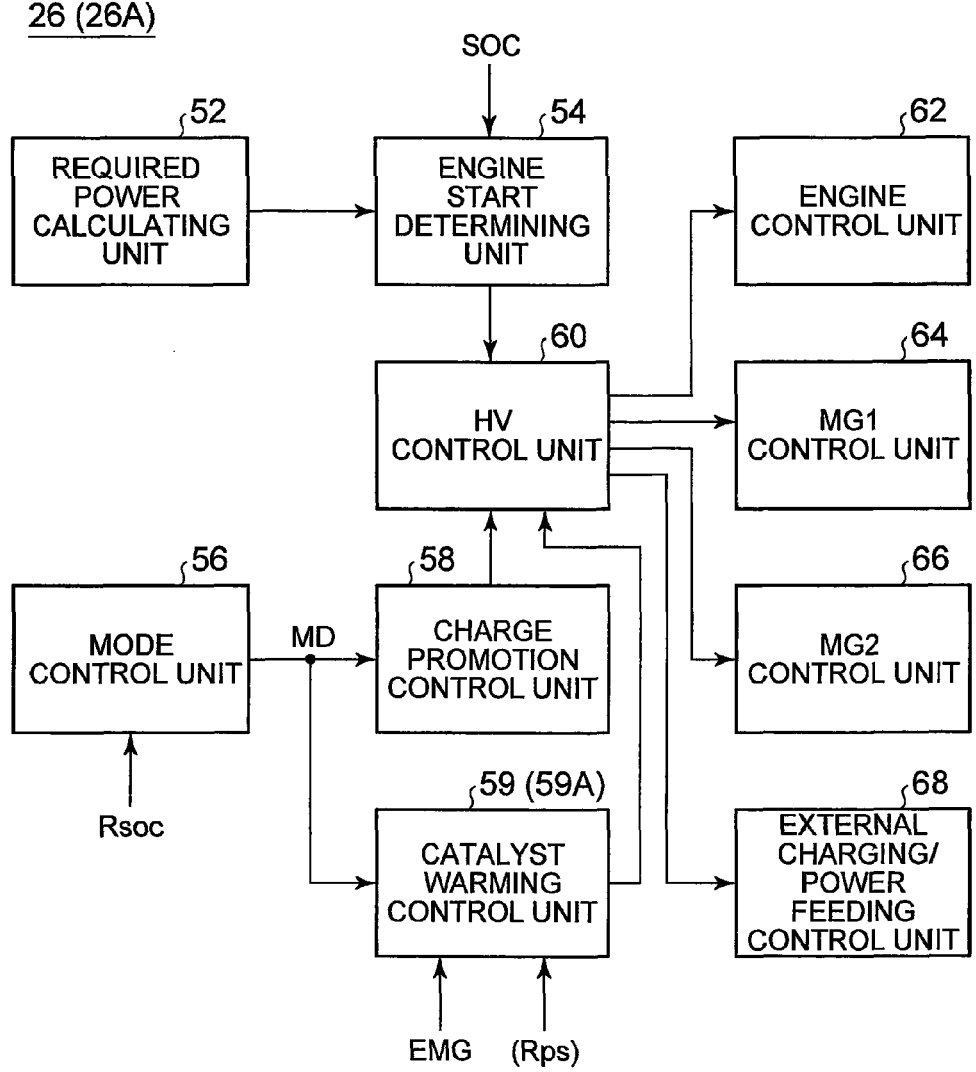
FIG. 6 is a block diagram functionally showing a configuration of an electronic control unit (ECU) shown in FIG. 1.

FIG. 6 is a block diagram functionally showing a configuration of the ECU 26 shown in FIG. 1. Referring to FIG. 6, the ECU 26 includes a required power calculating unit 52, an engine start determining unit 54, a mode control unit 56, a charge promotion control unit 58, a catalyst warming control unit 59, and an HV control unit 60. The ECU 26 further includes an engine control unit 62, an MG1 control unit 64, an MG2 control unit 66, and an external charging/power feeding control unit 68.

The required power calculating unit 52 calculates required vehicle power (hereinafter, also simply referred to as "required power") necessary for producing a drive force that is required by a driver based on an accelerator pedal operation amount, vehicle speed, and the like.

The engine start determining unit 54 determines whether or not the engine 2 is to be started based on the required power calculated by the required power calculating unit 52 and a charge/discharge required amount of the power storage device 16. Specifically, when a value obtained by adding a charge/discharge required amount (where a charge required amount assumes a positive value) of the power storage device 16 to required power equals or exceeds a prescribed engine start threshold, the engine start determining unit 54 outputs to the HV control unit 60 a command that instructs the engine 2 to be started. Moreover, the charge/discharge required amount of the power storage device 16 is determined based on the SOC. For example, the lower the SOC, the greater the charge required amount, and the higher the SOC, the greater the discharge required amount.

The mode control unit 56 controls charging modes (the fast charge mode, the slow charge mode, and the off state) based on the request signal Rsoc that is received from the SOC recovery switch 28. Specifically, as shown in FIG. 3, the mode control unit 56 successively switches among the fast charge mode, the slow charge mode, and the off state each time the request signal Rsoc is received from the SOC recovery switch 28 in accordance with an operation of the SOC recovery switch 28 that is performed by the user. In addition, the mode control unit 56 generates a mode signal MD indicating a state of the charging mode (including the off state) and outputs the mode signal MD to the charge promotion control unit 58 and, at the same time, outputs a state of mode to the SOC recovery switch 28 for display purposes.

When the mode signal MD from the mode control unit 56 indicates the fast charge mode, the charge promotion control unit 58 outputs a command that instructs the engine 2 to be started and the power storage device 16 to be forcibly charged using the MG 6 to the HV control unit 60 regardless of the determination result of the engine start determining unit 54. In addition, when the mode signal MD from the mode control unit 56 indicates the slow charge mode, the charge promotion control unit 58 outputs, to the HV control unit 60, a command that instructs charging of the power storage device 16 to be promoted using the MG 6 when starting of the engine 2 is instructed by the engine start determining unit 54.

When the catalyst warming control unit 59 determines that the temperature of the catalyst of the catalyst device 24 has dropped, the catalyst warming control unit 59 executes warming control for warming the catalyst device 24. Specifically, in order to warm the catalyst device 24, the ECU 26 outputs a command that instructs the engine. 2 to be operated while limiting the output of the engine 2 to the HV control unit 60.

At this point, in the event that disaster information EMG is received from the car navigation device 30 when the mode signal MD from the mode control unit 56 indicates a charge request (the fast charge mode or the slow charge mode), the catalyst warming control unit 59 outputs a command that instructs the output limitation of the engine 2 to be eased to the HV control unit 60. In other words, even during warming control, when an increase of the amount of charge of the power storage device 16 is requested using the SOC recovery switch 28 and, at the same time, disaster information is received, increasing the amount of charge of the power storage device 16 is given a higher priority than warming of the catalyst device 24.

When starting of the engine 2 is instructed by a command from the engine start determining unit 54 or the charge promotion control unit 58, the HV control unit 60 outputs a command that instructs the engine 2 to be operated to the engine control unit 62. In addition, upon start of the engine 2, the HV control unit 60 outputs a command that instructs powered driving of the MG 6 to be performed in order to crank the engine 2 to the MG1 control unit 64. Subsequently, when the engine 2 starts, the HV control unit 60 outputs a command that instructs regenerative driving of the MG 6 to be performed to the MG1 control unit 64. Furthermore, the HV control unit 60 outputs a command that instructs the MG 10 to be driven to the MG2 control unit 66.

In addition, when the HV control unit 60 receives a command that instructs output of the engine 2 to be limited from the catalyst warming control unit 59, the HV control unit 60 outputs a command to the engine control unit 62 so as to limit the output of the engine 2. Furthermore, when the HV control unit 60 receives a command that instructs the output limitation of the engine 2 to be eased from the catalyst warming control unit 59, the HV control unit 60 outputs a command to the engine control unit 62 so as to ease the output limitation of the engine 2.

In addition, when external charging is requested, the HV control unit 60 outputs a command that instructs the power converter 32 to be driven so as to operate as a charger (converter) to the external charging/power feeding control unit 68. Furthermore, when external power feeding is requested, the HV control unit 60 outputs a command that instructs the power converter 32 to be driven so as to operate as a power feeder (inverter) to the external charging/power feeding control unit 68.

Upon receiving a command that instructs the engine 2 to be operated from the HV control unit 60, the engine control unit 62 generates a control signal for operating the engine 2 and outputs the control signal to the engine 2. In addition, upon receiving a command that instructs the output of the engine 2 to be limited from the HV control unit 60, the engine control unit 62 generates a control signal for limiting the output of the engine 2 and outputs the control signal to the engine 2. Furthermore, upon receiving a command that instructs the output limitation of the engine 2 to be eased from the HV control unit 60, the engine control unit 62 generates a control signal for operating the engine 2 by easing the output limitation of the engine 2 and outputs the control signal to the engine 2.

When the MG1 control unit 64 receives a command that instructs the MG 6 to be driven from the HV control unit 60, the MG1 control unit 64 generates a control signal for driving the power converter 18 and outputs the control signal to the power converter 18. When the MG2 control unit 66 receives a command that instructs the MG 10 to be driven from the HV control unit 60, the MG2 control unit 66 generates a control signal for driving the power converter 20 and outputs the control signal to the power converter 20.

When external charging is being requested, the external charging/power feeding control unit 68 generates a control signal for causing the power converter 32 to be operated as a charger (converter) and outputs the control signal to the power converter 32. In addition, when external power feeding is being requested, the external charging/power feeding control unit 68 generates a control signal for causing the power converter 32 to be operated as a power feeder (inverter) and outputs the control signal to the power converter 32.

Figure 7:
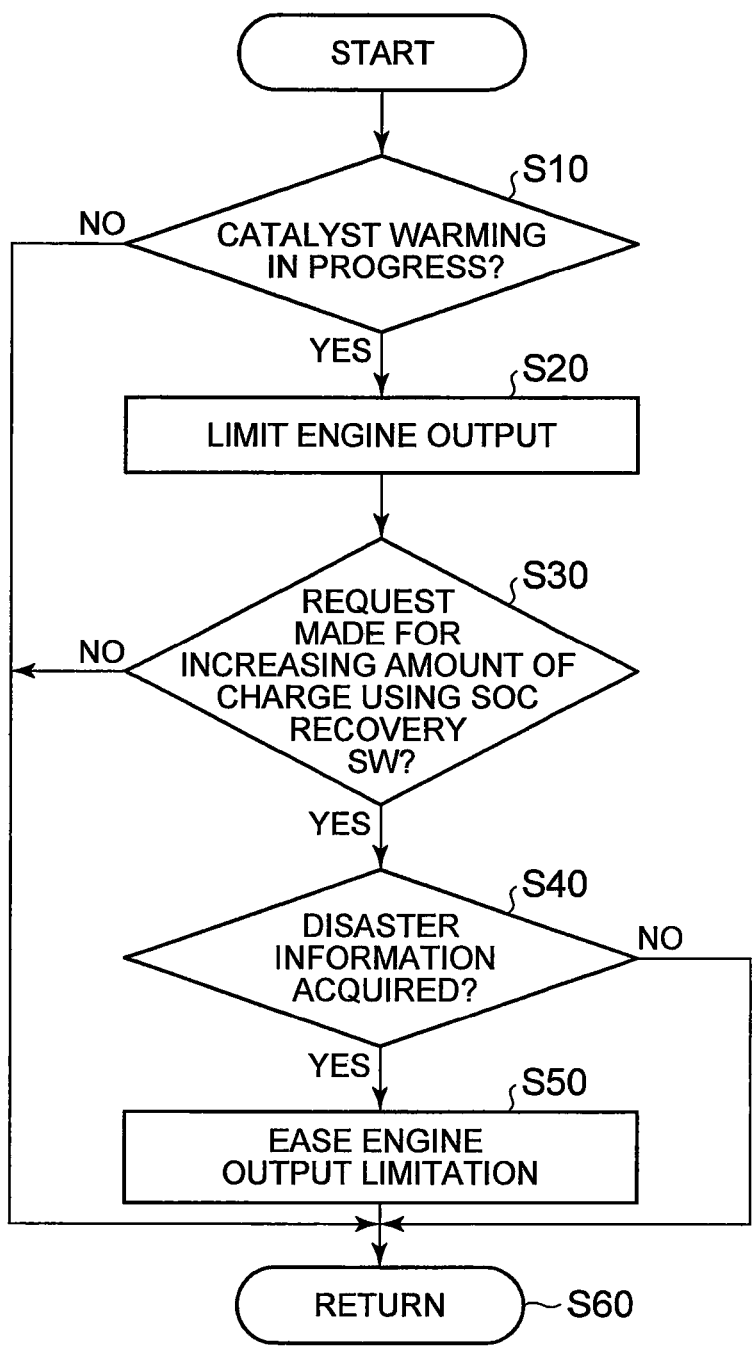
FIG. 7 is a flow chart for illustrating processing which is related to an output limitation of an engine and which is executed by the ECU.

FIG. 7 is a flow chart for illustrating processing which is related to the output limitation of the engine 2 and which is executed by the ECU 26. This flow chart can be realized as a result of a program stored in advance being called and executed from a main routine. Alternatively, processing of all of or a part of the steps can be realized by constructing dedicated hardware (electronic circuit).

Referring to FIG. 7, the ECU 26 determines whether or not warming control for warming the catalyst device 24 is being executed (step S 10). When catalyst warming is not being executed (NO in step S10), a transition is made to the process of step S60 without executing the subsequent series of processes.

In step S10, when it is determined that catalyst warming is being executed (YES in step S10), the ECU 26 controls the engine 2 so as to limit output of the engine 2 (step S20). Next, the ECU 26 determines whether or not a request for increasing the amount of charge of the power storage device 16 has been made using the SOC recovery switch 28 (step S30). The request for increasing the amount of charge may be for the fast charge mode or for the slow charge mode. When an increase in the amount of charge has not been requested (NO in step S30), a transition is made to the process of step S60.

In step S30, when it is determined that an increase in the amount of charge of the power storage device 16 has been requested (YES in step S30), the ECU 26 determines whether or not disaster information has been acquired by the car navigation device 30 (step S40). When it is determined that disaster information has been acquired (YES in step S40), the ECU 26 controls the engine 2 so as to ease the output limitation of the engine 2 (step S50). Moreover, when disaster information has not been acquired (NO in step S40), a transition is made to the process of step S60.

As described above, the first embodiment is provided with the SOC recovery switch 28 that is used by the user to request an increase of the amount of charge of the power storage device. 16. When a request for increasing the amount of charge is made using the SOC recovery switch 28, charging of the power storage device 16 by the engine 2 and the MG 6 is performed so that charging of the power storage device 16 is promoted (charge promotion control). On the other hand, warming of the catalyst device 24 is performed by operating the engine 2 while limiting the output of the engine 2 (catalyst warming control). When catalyst warming control and charge promotion control overlap each other, since the output limitation of the engine 2 is eased, charge promotion control is not limited due to catalyst warming. Therefore, according to the first embodiment, the amount of charge of the power storage device 16 can be swiftly increased in response to a request from the user.

Moreover, in the first embodiment, when catalyst warming control and charge promotion control overlap each other, the output limitation of the engine 2 is eased only when disaster information is being received by the car navigation device 30. Therefore, according to the first embodiment, the amount of charge of the power storage device 16 can be swiftly increased in order to use the hybrid vehicle 100 as a power generating facility capable of external power feeding in the event of a disaster.

Moreover, while disaster information is assumed to be received by the car navigation device 30 in the description given above, a communication device capable of receiving disaster information may be separately provided without using the car navigation device 30.

In addition, an input unit may be provided which can be used by the user to input an occurrence of a disaster or another crisis in the car navigation device 30 or in place of the car navigation device 30, whereby when catalyst warming control and charge promotion control overlap each other, the output limitation of the engine 2 may be eased when the input unit is operated.

In a second embodiment, when warming control for warming the catalyst device 24 and charge promotion control using the SOC recovery switch 28 overlap each other, the output limitation of the engine 2 is eased when external power feeding is being requested. This is performed in order to give higher priority to charge promotion control than warming control when external power feeding is being requested so that external power feeding is not limited when the hybrid vehicle is used as a power generating facility capable of external power feeding in the event of a disaster.

An overall configuration of a hybrid vehicle according to the second embodiment is the same as that of the hybrid vehicle 100 described in FIG. 1.

Once again referring to FIG. 6, an ECU 26A according to the second embodiment includes a catalyst warming control unit 59A in place of the catalyst warming control unit 59 in the configuration of the ECU 26 according to the first embodiment. In the event that the catalyst warming control unit 59A is receiving a request signal Rps for requesting external power feeding when the mode signal MD from the mode control unit 56 indicates a charge request (the fast charge mode or the slow charge mode), the catalyst warming control unit 59A outputs a command that instructs the output limitation of the engine 2 to be eased to the HV control unit 60. In other words, even during warming control, when an increase of the amount of charge of the power storage device 16 is requested using the SOC recovery switch 28 and, at the same time, external power feeding is requested, increasing the amount of charge of the power storage device 16 is given a higher priority than warming of the catalyst device 24. Other parts of the configuration of the ECU 26A are the same as those of the ECU 26 according to the first embodiment.

Figure 8:
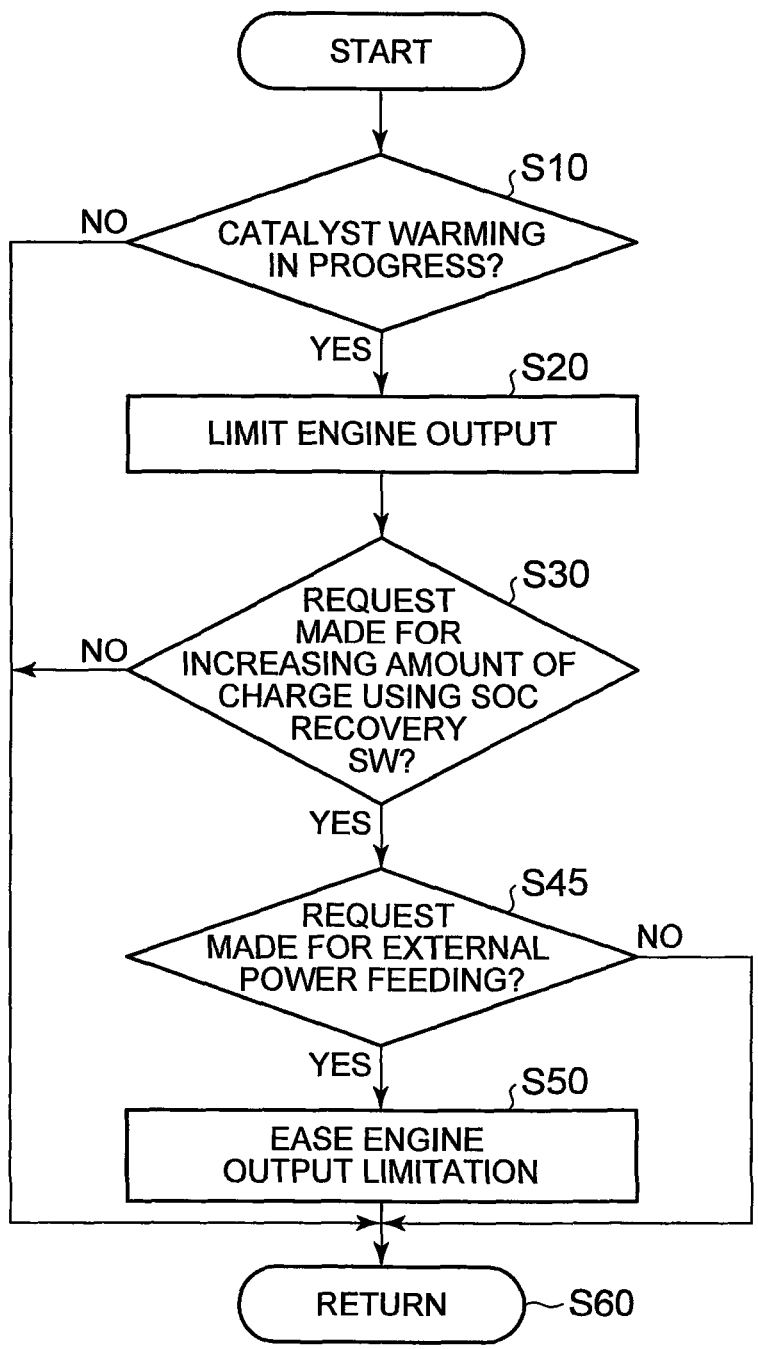
FIG. 8 is a flow chart for illustrating processing which is related to an output limitation of an engine and which is executed by an ECU according to a second embodiment.

FIG. 8 is a flow chart for illustrating processing which is related to an output limitation of the engine 2 and which is executed by the ECU 26A according to the second embodiment. Referring to FIG. 8, the flow chart includes step S45 in place of step S40 in the flow chart shown in FIG. 7.

Specifically, when it is determined in step S30 that an increase in the amount of charge of the power storage device 16 is being requested using the SOC recovery switch 28 (YES in step S30), the ECU 26A determines whether or not feeding of power to an electrical load connected to the connecting part 34 (external power feeding) is being requested (step S45). Subsequently, when it is determined that external power feeding is being requested (YES in step S45), a transition is made to the process of step S50 and the ECU 26A controls the engine 2 so as to ease the output limitation of the engine 2. Moreover, when external power feeding is not being requested (NO in step S45), a transition is made to the process of step S60.

As described above, according to the second embodiment, when catalyst warming control and charge promotion control overlap each other, output limitation of the engine 2 is eased when external power feeding is being requested. Therefore, according to the second embodiment, the amount of charge of the power storage device 16 can be swiftly increased in order to use the hybrid vehicle 100 as a power generating facility capable of external power feeding in the event of a disaster.

While the first embodiment described earlier is configured to ease the output limitation of the engine 2 when disaster information is being received and the second embodiment described above is configured to ease the output limitation of the engine 2 when external power feeding is being requested, even when such conditions are not applied, the output limitation of the engine 2 may be eased to respect the intentions of the user having operated the SOC recovery switch 28.

In addition, while the respective embodiments described above are configured so that switching between two charge modes (the fast charge mode and the slow charge mode) can be performed by the user by operating the SOC recovery switch 28, this invention can also be applied to hybrid vehicles not equipped with such a mode switching function (for example, a hybrid vehicle only having the fast charge mode).

Furthermore, in the respective embodiments described above, while the hybrid vehicle 100 is configured as a series/parallel vehicle capable of splitting power of the engine 2 and transmitting the split power to the drive shaft 12 and the MG 6 using the power splitting device 4, this invention can also be applied to hybrid vehicles of other types. For example, this invention can also be applied to a so-called series hybrid vehicle which uses the engine 2 only to drive the MG 6 and which generates a drive force of the vehicle only using the MG 10, to a hybrid vehicle in which only regenerative energy among kinetic energy generated by an engine is recovered as electrical energy, to a motor-assisted hybrid vehicle in which an engine is used as a main power source and a motor provides assistance when necessary, and the like.

Moreover, in the description given above, the engine 2 corresponds to an example of an "internal combustion engine" according to the invention and the MG 6 corresponds to an example of a "generating device" according to the invention. In addition, the ECUs 26 and 26A correspond to examples of a "control device" according to the invention and the SOC recovery switch 28 corresponds to an example of an "input device" according to the invention. Furthermore, the car navigation device 30 corresponds to an example of a "communication device" according to the invention and the power converter 32 and the connecting part 34 correspond to examples of a "power feeding device" according to the invention.

The embodiments disclosed herein should be considered in all respects illustrative and not restrictive. It is intended that the scope of the invention be defined not by the description of the embodiment given above but rather by the claims appended hereto, and that the scope of the invention include equivalents thereof and all modifications made therein.

The invention claimed is:

1. A hybrid vehicle, comprising:
a power storage device;
an internal combustion engine;
a generating device that generates charging power of the power storage device in use of output of the internal combustion engine;
a control device that controls charging of the power storage device by the generating device;
an input device that is used by a user to request an increase in the amount of charge of the power storage device; and
a catalyst device that cleans exhaust gas, which is discharged from the internal combustion engine, with a catalyst, wherein
when a request for increasing the amount of charge is made using the input device, the control device controls charging of the power storage device by the generating device such that the power storage device is charged, warms the catalyst device by operating the internal combustion engine while limiting the output of the internal combustion engine, and when the warming of the catalyst device and the request for increasing the amount of charge that is made using the input device overlap each other, the control device eases an output limitation of the internal combustion engine.

2. The hybrid vehicle according to claim 1, wherein
the control device includes a charge promotion control unit that controls charging of the power storage device by the generating device such that the power storage device is charged when the request for increasing the amount of charge is made using the input device and a warming control unit that warms the catalyst device by operating the internal combustion engine while limiting the output of the internal combustion engine, and
when the warming of the catalyst device and the request for increasing the amount of charge that is made using the input device overlap each other, the warming control unit eases the output limitation of the internal combustion engine.

3. The hybrid vehicle according to claim 1, wherein
the control device eases the output limitation of the internal combustion engine only when a prescribed condition is met when the warming of the catalyst device and the request for increasing the amount of charge that is made using the input device overlap each other.

4. The hybrid vehicle according to claim 3, further comprising
a communication device capable of communicating with outside of the vehicle, wherein the prescribed condition is a reception of prescribed information by the communication device.

5. The hybrid vehicle according to claim 4, wherein the prescribed information includes disaster information.

6. The hybrid vehicle according to claim 3, further comprising
a power feeding device that feeds at least one of power stored in the power storage device and. power generated by the generating device to the outside of the vehicle, wherein
the prescribed condition is a request of the feeding of power by the power feeding device to the outside of the vehicle.

7. The hybrid vehicle according to claim 1, wherein
when the request for increasing the amount of charge is made using the input device, the control device controls charging of the power storage device by the generating device so as to increase a charged state of the power storage device.

8. The hybrid vehicle according to claim 1, wherein
when the request for increasing the amount of charge is made using the input device, the control device controls charging of the power storage device by the generating device so as to increase a charging rate of the power storage device.

9. A control method for a hybrid vehicle including: a power storage device; an internal combustion engine; a generating device that generates charging power of the power storage device in use of output of the internal combustion engine; a control device that controls charging of the power storage device by the generating device; an input device that is used by a user to request an increase in the amount of charge of the power storage device; and a catalyst device that cleans exhaust gas, which is discharged from the internal combustion engine, with a catalyst,
the control method comprising:
controlling, when a request for increasing the amount of charge is made using the input device, charging of the power storage device by the generating device such that the power storage device is charged;
warming the catalyst device by operating the internal combustion engine while limiting the output of the internal combustion engine; and
easing the output limitation of the internal combustion engine when the warming of the catalyst device and the request for increasing the amount of charge that is made using the input device overlap each other.

* * * * *